US012598346B2

(12) United States Patent (10) Patent No.: US 12,598,346 B2
Seo et al. (45) Date of Patent: Apr. 7, 2026

(54) DISPLAY DEVICE AND OPERATION METHOD THEREOF

(71) Applicant: LG ELECTRONICS INC., Seoul (KR)

(72) Inventors: Chuhyun Seo, Seoul (KR); Wookeun Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/834,078

(22) PCT Filed: Feb. 7, 2022

(86) PCT No.: PCT/KR2022/001834
§ 371 (c)(1),
(2) Date: Jul. 29, 2024

(87) PCT Pub. No.: WO2023/149590
PCT Pub. Date: Aug. 10, 2023

(65) Prior Publication Data
US 2025/0159278 A1 May 15, 2025

(51) Int. Cl.
*H04N 21/431* (2011.01)
*H04N 21/472* (2011.01)
(Continued)

(52) U.S. Cl.
CPC ... *H04N 21/4316* (2013.01); *H04N 21/47214* (2013.01); *H04N 21/4722* (2013.01);
(Continued)

(58) Field of Classification Search
CPC .... H04N 21/81; H04N 21/431; H04N 21/472; H04N 21/482; H04N 21/488;
(Continued)

(56) References Cited

U.S. PATENT DOCUMENTS

2002/0157101 A1*  10/2002  Schrader ............ H04N 21/8586
                                                          348/E7.063
2010/0235376 A1*   9/2010  Sukanen ................. G06F 16/68
                                                            707/769
2019/0141399 A1*   5/2019  Auxer ................ H04N 21/4753

FOREIGN PATENT DOCUMENTS

KR     10-2013-0143485 A    12/2013
KR     10-2016-0066914 A     6/2016
(Continued)

*Primary Examiner* — Peet Dhillon
(74) *Attorney, Agent, or Firm* — Birch, Stewart, Kolasch & Birch, LLP

(57) ABSTRACT
The present disclosure is intended to provide a display device that provides a sports alarm function that allows users to watch their preferred sports regardless of whether they subscribe to a channel or whether a broadcast is transmitted, and a method of operating the same. And the display device may comprise a wireless communication interface configured to receive sports information, a display configured to display a viewing icon for at least one sport game based on the sports information, and a controller configured to display a broadcast of the sport game when the viewing icon is selected, wherein the viewing icon comprises an icon for switching to a channel broadcasting the sport game and an icon for executing an application providing the sport game.

11 Claims, 12 Drawing Sheets

(51) Int. Cl.

| | | |
|---|---|---|
| *H04N 21/4722* | (2011.01) | |
| *H04N 21/482* | (2011.01) | |
| *H04N 21/488* | (2011.01) | |
| *H04N 21/81* | (2011.01) | |

(52) U.S. Cl.
  CPC ....... *H04N 21/482* (2013.01); *H04N 21/4882*
          (2013.01); *H04N 21/8126* (2013.01)

(58) Field of Classification Search
  CPC ........... H04N 21/4312; H04N 21/4316; H04N
          21/4586; H04N 21/4722; H04N 21/4882;
              H04N 21/8126; H04N 21/8133; H04N
                              21/47214
  See application file for complete search history.

(56)              References Cited

FOREIGN PATENT DOCUMENTS

| | | | |
|---|---|---|---|
| KR | 10-2017-0126271 | A | 11/2017 |
| KR | 10-2020-0100761 | A | 8/2020 |
| KR | 10-2020-0107616 | A | 9/2020 |

* cited by examiner

Figure 2:
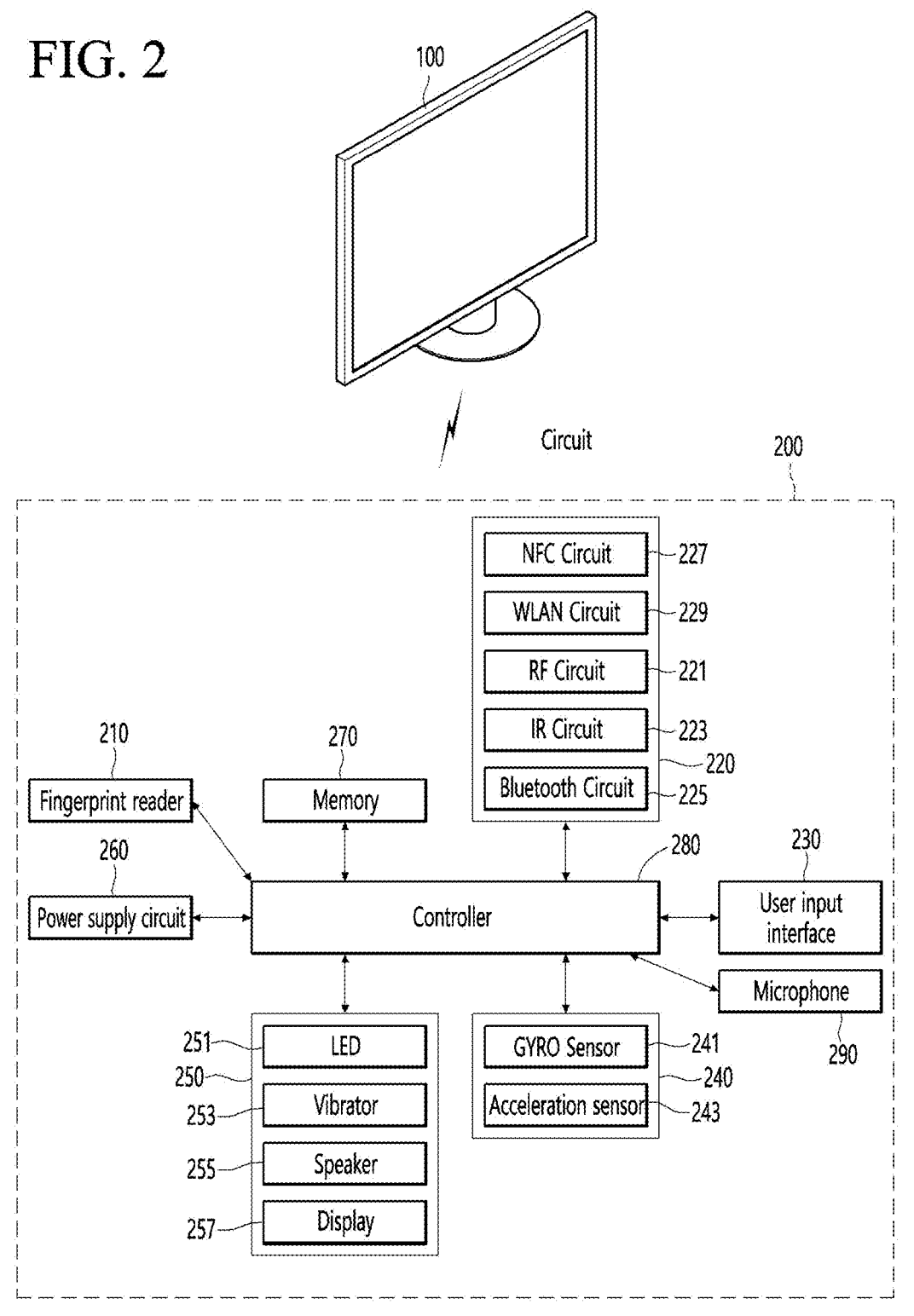

Circuit     200

| | |
|---|---|
| NFC Circuit | 227 |
| WLAN Circuit | 229 |
| RF Circuit | 221 |
| IR Circuit | 223 |
| Bluetooth Circuit | 225 |

220

210

Fingerprint reader

270

Memory

260

Power supply circuit

280

Controller

230

User input interface

Microphone

290

251 — LED
250
253 — Vibrator
255 — Speaker
257 — Display

241 — GYRO Sensor
240
243 — Acceleration sensor

DISPLAY DEVICE AND OPERATION METHOD THEREOF

CROSS REFERENCE TO RELATED APPLICATIONS

This application is the National Phase of PCT International Application No. PCT/KR2022/001834, filed on Feb. 7, 2022, all of which is hereby expressly incorporated by reference into the present application.

BACKGROUND

Technical Field

The present disclosure relates to a display device and a method of operating the same, and more specifically, to a display device that provides a sport alarm and a method of operating the same.

Discussion of the Related Art

Digital TV services using wired or wireless communication networks are becoming common. The digital TV services may provide various services that cannot be provided by existing analog broadcasting services.

For example, in the case of IPTV (Internet Protocol Television) and smart TV services, which are types of digital TV services, interactivity is provided so that users can actively select the types of programs to watch, the viewing time, and the like. IPTV and smart TV services may provide various additional services, such as Internet search, home shopping, online games, etc., based on such interactivity.

Additionally, the display device may provide an alarm function for sports in which the user is interested. Specifically, the display device may provide notifications about the start of a game, score, or game result for a sport in which the user is interested, and may also provide a function to switch to a broadcast channel where the user can immediately watch the sport.

However, if the user is not subscribed to the channel broadcasting the sport or is in an area where transmission of the channel broadcasting the sport is not possible, there is the inconvenience of not being able to watch the channel.

SUMMARY

The present disclosure seeks to provide a display device that provides a sports alarm function that allows users to watch their preferred sports regardless of channel subscription or broadcasting, and a method of operating the same.

The present disclosure seeks to provide a display device that provides various viewing paths for sports broadcasts and a method of operating the same.

The display device and its operating method according to an embodiment of the present disclosure can provide an icon for switching to the corresponding broadcast channel or executing an application so that the user can immediately watch the user's preferred sports.

The display device and its operating method according to an embodiment of the present disclosure can manage the ID of each sport game as data by receiving and mapping the ID of each sport game in advance from the contents provider in order to link it with an application that can view the user's preferred sports.

The display device according to an embodiment of the present disclosure comprises a wireless communication interface configured to receive sports information, a display configured to display a viewing icon for at least one sport game based on the sports information, and a controller configured to display a broadcast of the sport game when the viewing icon is selected, wherein the viewing icon comprises an icon for switching to a channel broadcasting the sport game and an icon for executing an application providing the sport game.

The controller can execute the application providing the sport game based on an ID mapped to the sport game, when the icon for executing the application providing the sport game is selected.

The controller can acquire data in which IDs corresponding to each of a plurality of sports games are mapped.

The controller can update the data at each preset period.

The controller acquire metadata for each of a plurality of sport games, receive an ID for the sport game provided by each contents provider from contents provider, and map the ID for the sport game provided by the contents provider to the sport game according to the metadata.

The controller can request the contents provider to modify information about ID that does not have a mapped sport game, if there is no ID mapped to the sport game according to the metadata.

The controller can display a viewing icon for a sport game when the sport game starts or when a score change in the sport game occurs.

The controller can display a viewing icon corresponding to the preferred sport event, preferred sport team, or preferred sport player, when an input for selecting at least one of the user's preferred sport event, preferred sport team, or preferred sport player is received.

The controller can further display at least one of the game information, game detailed information icon, and alarm release icon along with the viewing icon.

An operating method of display device according to an embodiment of the present disclosure comprises receiving sports information, displaying a viewing icon for at least one sport game based on the sports information, and displaying a broadcast of the sport game, when the viewing icon is selected, wherein the displaying of the viewing icon comprises displaying an icon for switching to a channel broadcasting the sport game and an icon for executing an application providing the sport game.

The displaying the broadcast of the sport game comprises executing the application providing the sport game based on an ID mapped to the sport game, when the icon for executing the application providing the sport game is selected.

The operating method of display device further comprises acquiring data in which IDs corresponding to each of a plurality of sports games are mapped.

The acquiring of the data comprises acquiring metadata for each of a plurality of sport games, receiving an ID for a sport game provided by each contents provider from contents provider, and mapping the ID for the sport game provided by the contents provider to the sport game according to the metadata.

The acquiring of the data comprises requesting the contents provider to modify information about ID that does not have a mapped sport game, if there is no ID mapped to the sport game according to the metadata.

The displaying of the viewing icon comprises displaying a viewing icon for a sport game when the sport game starts or when a score change in the sport game occurs.

Advantageous Effects

According to an embodiment of the present disclosure, the implementation of the sports alarm function is secured and user convenience is improved, by guiding various viewing paths that can be viewed regardless of whether the user subscribes to the channel or whether the broadcast is transmitted, etc. when a user's preferred sports is broadcast.

According to an embodiment of the present disclosure, there is a technical advantage that it is possible to provide the sport game provided by the contents provider to the user through an application, etc. by receiving the ID of each sport game from the contents provider in advance and mapping it to the corresponding sport game.

BRIEF DESCRIPTION OF THE DRAWINGS

FIG. 2 is a block diagram of a remote control device according to an embodiment of the present disclosure.

FIG. 3 shows an example of the actual configuration of a remote control device according to an embodiment of the present disclosure.

FIG. 7 is a diagram illustrating an example in which a display device according to an embodiment of the present disclosure outputs a sports alarm by displaying a viewing icon.

FIG. 8 is a diagram illustrating an example of a screen displayed by a display device according to an embodiment of the present disclosure when a sports alarm is selected.

FIG. 10 is a first example diagram of a screen on which a display device displays setting information of a sports alarm according to an embodiment of the present disclosure.

DETAILED DESCRIPTION OF THE EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present disclosure is, for example, an intelligent display device in which a computer support function is added to a broadcast reception function, and may have an easy-to-use interface such as a handwritten input device, a touch screen, a spatial remote control, or the like since an Internet function is added while fulfilling the broadcast receiving function. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
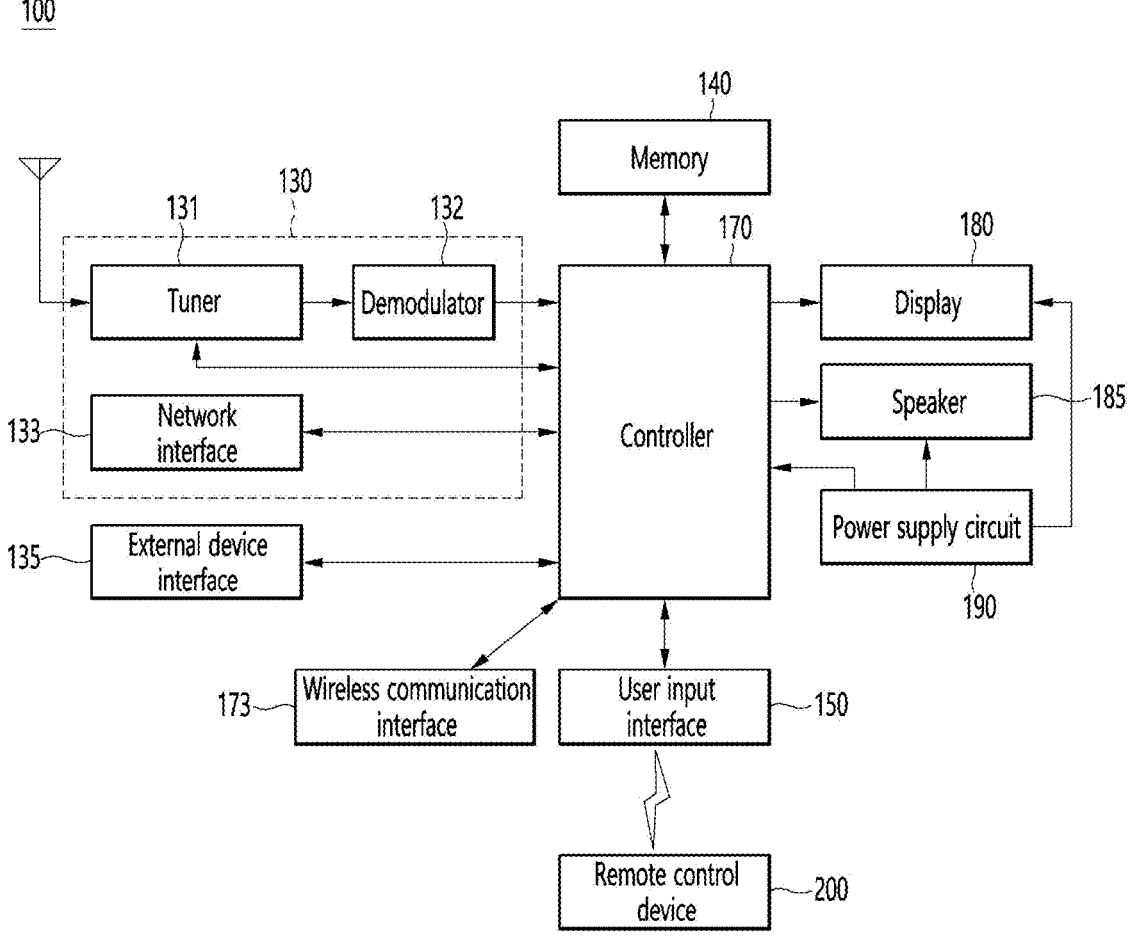
FIG. 1 is a block diagram showing the configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a contents provider or a network operator. That is, the network interface 133 may receive content such as movies, advertisements, games, VOD, and broadcast signals and information related thereto provided from a contents provider or a network provider through a network.

In addition, the network interface 133 may receive update information and update files of firmware provided by the network operator, and may transmit data to an Internet or contents provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R. G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play the same.

For example, the display device 100 may be divided into an image processing device, such as a set-top box, for receiving broadcast signals or content according to various network services, and a content playback device that plays content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 3:
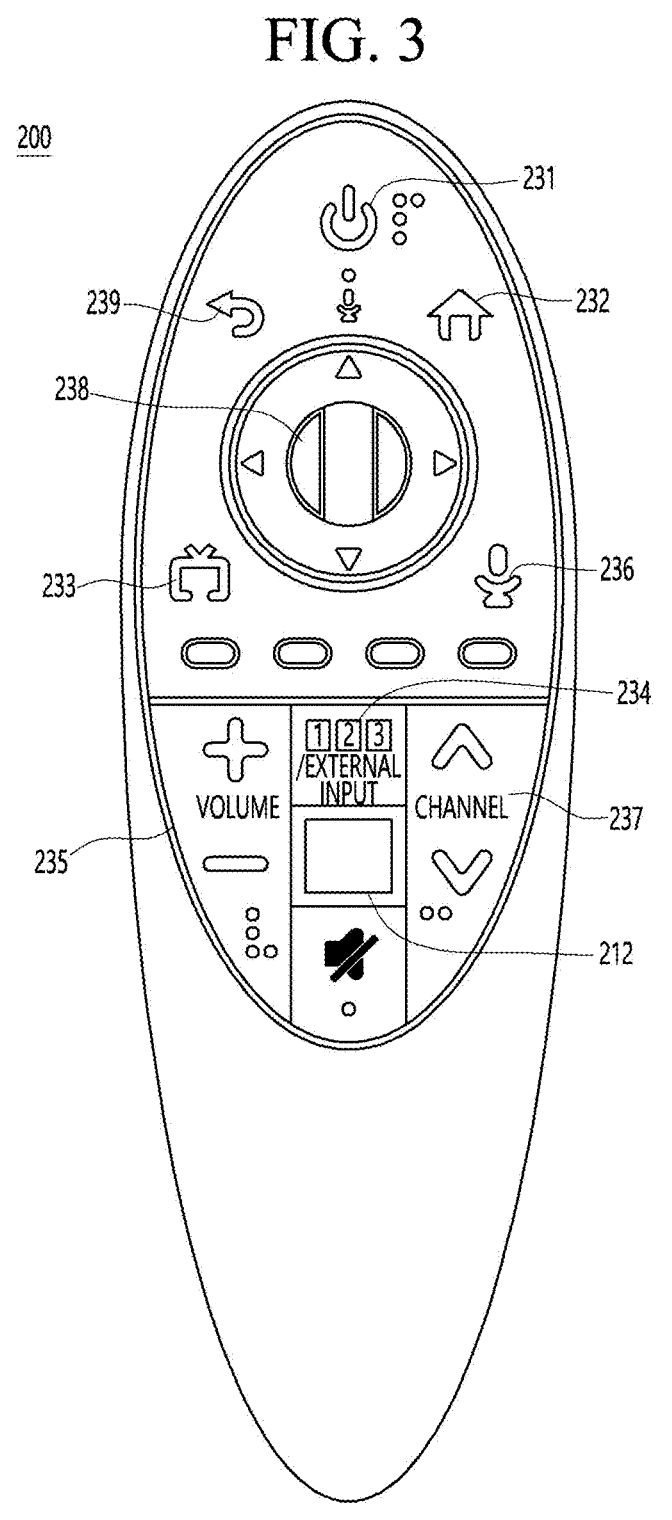

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240), an output interface 250), a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230) is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication interface 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270) may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 235 or a signal corresponding to the movement of the remote control device 200 sensed by the sensor 240 through the wireless communication interface 225.

Also, the microphone 290 of the remote control device 200 may obtain a speech.

A plurality of microphones 290 may be provided.

Next, a description will be given referring to FIG. 4.

Figure 4:
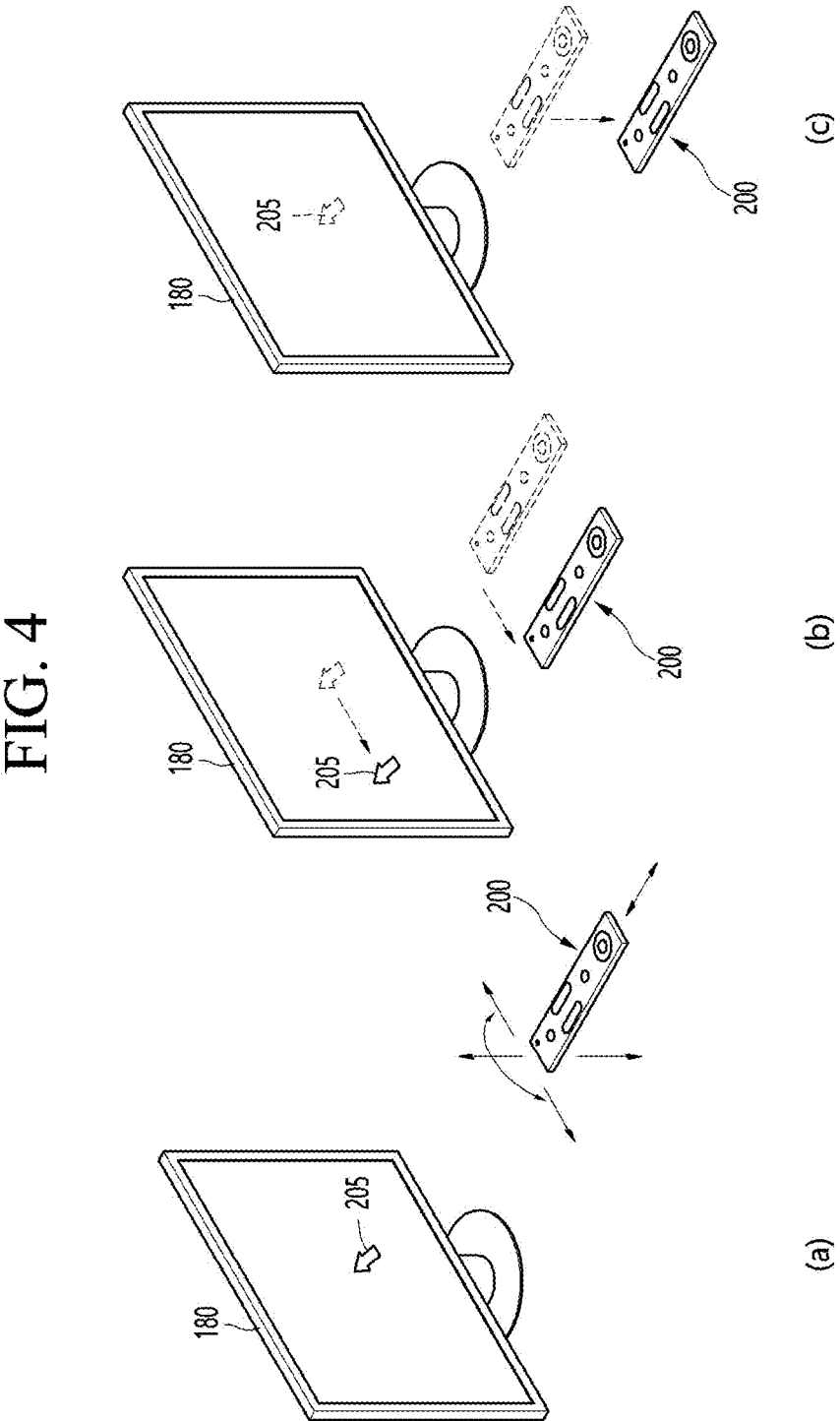
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
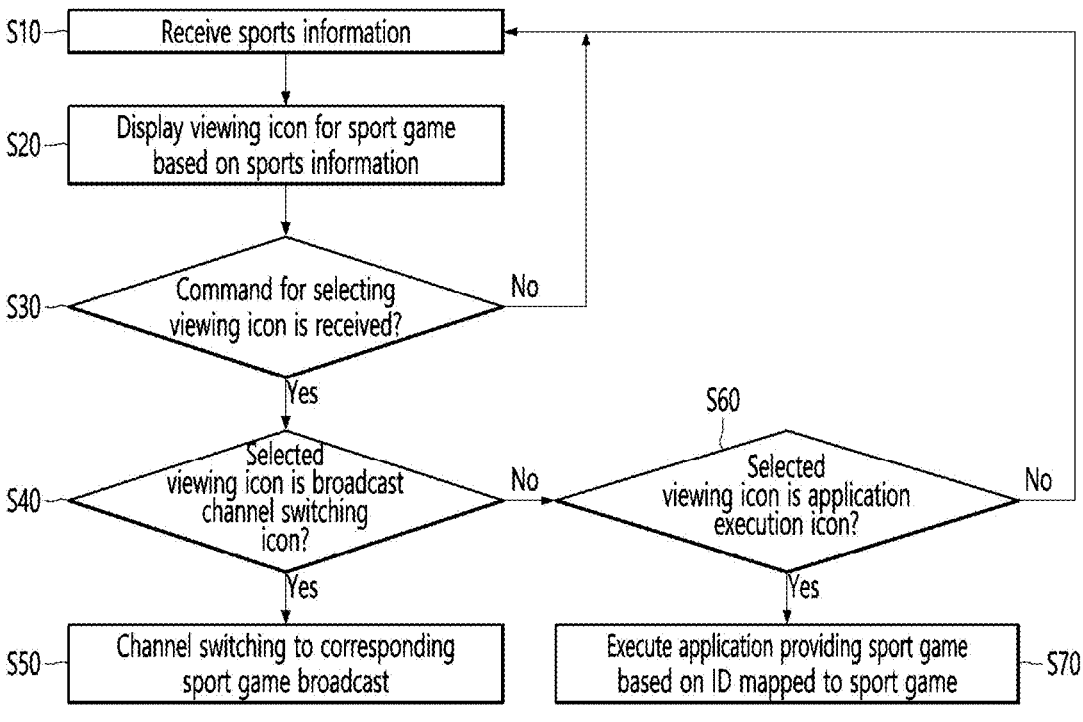
FIG. 5 is a flowchart showing an operating method of a display device according to an embodiment of the present disclosure.

FIG. 5 is a flowchart showing an operating method of a display device according to an embodiment of the present disclosure.

The controller 170 can receive sports information (S10).

Sports information can refer to various information about sport games that have already ended, are currently in progress, or are scheduled for the future. Sports information may include information such as game schedules for each event, team, and player, game score, and game state, etc.

The controller 170 may receive sports information through the wireless communication interface 173. The controller 170 can receive sports information from the outside. For example, the controller 170 may receive sports information from an external server (not shown) that collects sports-related data. Alternatively, the controller 170 may receive sports information by directly collecting sports-related data. In addition, the controller 170 can receive sports information in various ways.

The controller 170 may display a viewing icon for a sport game based on sports information (S20).

That is, the controller 170 can control the display 180 to display a viewing icon for at least one sport game.

The viewing icon may be a user interface for switching to a channel where a user can immediately watch the corresponding sport game or executing an application. The viewing icon may include at least one of an icon for switching to a channel broadcasting a sport game or an icon for executing an application providing a sport game.

When the viewing icon is selected, the controller 170 can control the display 180 to display the broadcast of the corresponding sport game.

Based on sports information, when a change occurs in the sports game, such as when at least one sports game starts, when a score change occurs, or when the game ends, etc., the controller 170 displays a viewing icon along with information guiding the change.

The controller 170 may determine whether a command for selecting a viewing icon is received (S30).

If the viewing icon is not selected, the controller 170 may continue to receive sports information and display the viewing icon based on the received sports information.

When a viewing icon is selected, the controller 170 may determine whether the selected viewing icon is a broadcast channel switching icon (S40).

In other words, the controller 170 can obtain whether the viewing icon for switching to a channel broadcasting a sport game is selected.

Meanwhile, the order of step S40 may be changed from step S60, which will be described later. That is, when a viewing icon is selected, the order of determining whether the selected viewing icon is a broadcast channel switching icon or an application execution icon can be changed, so it is reasonable that it is not limited thereto. When a viewing icon is selected, the controller 170 may determine the type of the selected viewing icon. The controller 170 may simultaneously determine whether the selected viewing icon is a broadcast channel switching icon or an application execution icon.

When the broadcast channel switching icon is selected, the controller 170 can perform channel switching to the corresponding sport game broadcast (S50).

If the selected viewing icon is not a broadcast channel switching icon, the controller 170 may determine whether the selected viewing icon is an application execution icon (S60).

That is, the controller 170 can obtain whether a viewing icon for executing an application capable of watching a sport game is selected.

When the application execution icon is selected, the controller 170 can execute an application providing a sport game based on a ID mapped to the corresponding sport game (S70).

The controller 170 can map IDs to each sport game currently in progress or scheduled for the future. Here, ID may mean letters, numbers, or a combination thereof assigned to each sport game provided by the contents provider. In other words, ID may mean a type of code to identify each sport game provided by the provider. The memory 140 may store data whose ID is mapped to each sport game currently in progress or scheduled for the future. The controller 170 can obtain data in which IDs corresponding to each of a plurality of sport games are mapped.

In this way, by pre-storing and managing data with IDs mapped to each sport game, the display device 100 provides a viewing icon to guide each sport game when it can be viewed in the application and executes the application.

Accordingly, when the application execution icon is selected, the controller 170 can control the display 180 to execute and display the application providing the corresponding sport game according to the ID mapped to the corresponding sport game.

Meanwhile, the controller 170 receives key parameters for each sport game from the contents provider in order to store data in advance about when and in which application the sport game is provided, and stores and manages data by mapping the key parameters to each sport game. This will be explained with reference to FIG. 6.

Figure 6:
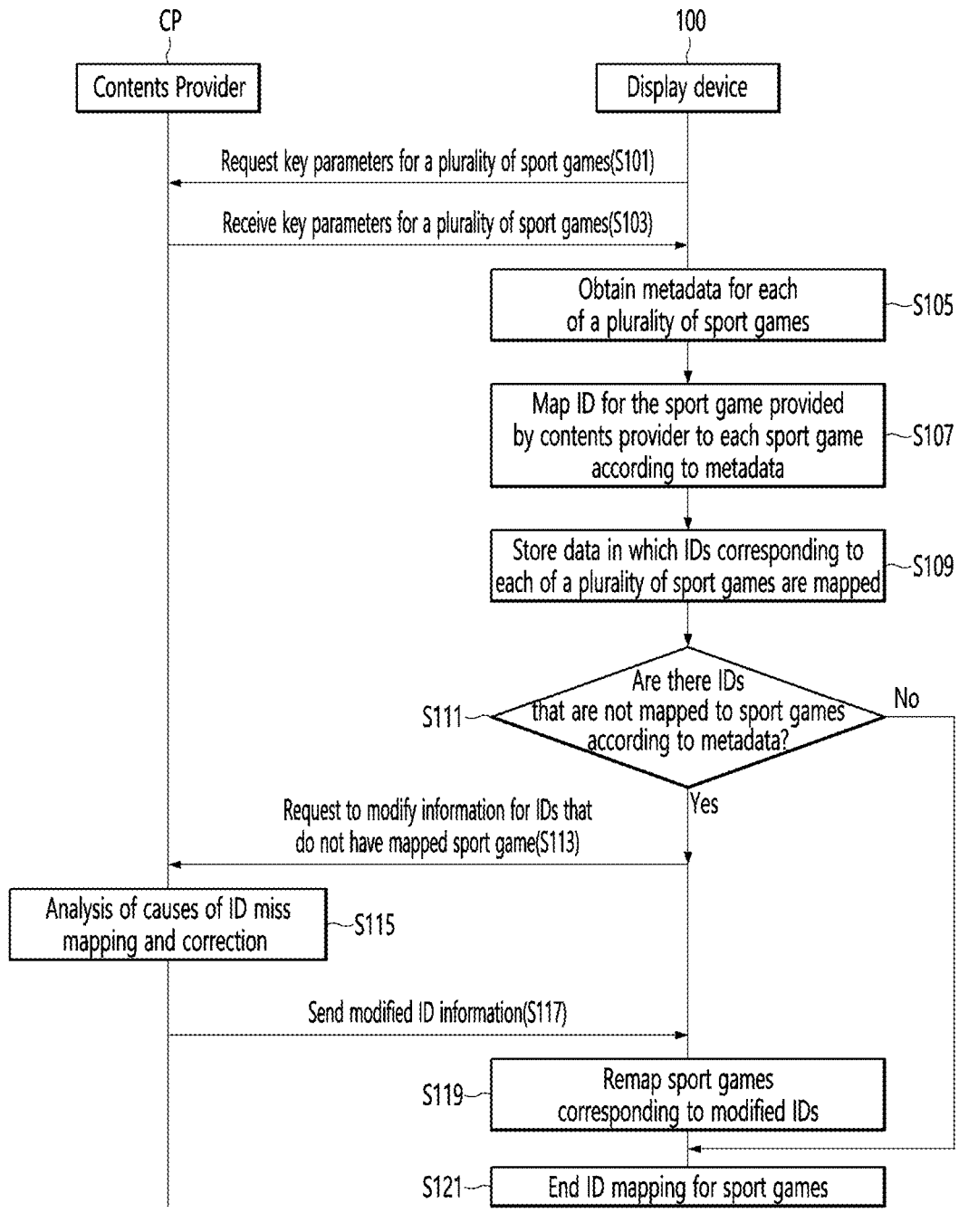
FIG. 6 is a flow chart illustrating a method in which a display device stores and manages data about a sport game provided by a contents provider according to an embodiment of the present disclosure.

FIG. 6 is a flow chart illustrating a method in which a display device stores and manages data about a sport game provided by a contents provider according to an embodiment of the present disclosure.

The controller 170 may request key parameters for a plurality of sport games to from contents provider (CP) (S101).

Here, the contents provider (CP: Contents Provider) may refer to a terminal or server of a company that has sports broadcasting rights and provides sport game broadcasting services.

Key parameters may include information about ID, match data, home team, and away team corresponding to each sport game provided by the contents provider. In other words, the key parameter may be separate information for the contents provider providing the sport game to manage each sport game. Therefore, even if it is the same sport game, the key parameter provided by the first contents provider and the key parameter provided by the second contents provider may be different. For example, the first contents provider may manage the ID of the first sport game as abc123, and the second contents provider may manage the ID of the first sport game as def111.

Since key parameters are managed differently for each contents provider, the controller 170 can receive key parameters for each of a plurality of sport games from the contents provider. That is, the controller 170 can receive key parameters for each sport game provided by each contents provider from a plurality of contents providers.

A contents provider (CP) may transmit key parameters for a plurality of sport games to the display device 100 according to a request for key parameters.

The display device 100 may receive key parameters for a plurality of sport games from a contents provider (CP) (S103).

That is, the controller 170 may receive key parameters for a plurality of sport games from the contents provider (CP) and obtain metadata for each of a plurality of sport games (S105).

Here, metadata for each of a plurality of sport games can be obtained from sports information received in step S10 of FIG. 5. Metadata for each of the plurality of sport games may include game schedule, game location, team information, etc. for each of the plurality of sport games. The metadata may include information about each of a plurality of sport games that the controller 170 acquires itself through information received from the outside, such as an Electronic Program Guide (EPG).

The controller 170 can obtain a finished, in-progress, or scheduled sport game through metadata.

The controller 170 can map the ID for the sport game provided by the contents provider to each sport game according to metadata (S107).

Specifically, the controller 170 can obtain the ID corresponding to each sport game according to metadata from a key parameter, thereby mapping the corresponding ID to each sport game according to metadata. For example, the controller 170 can obtain the first sport game of teams A and B scheduled at 5 pm on February 3, and the second sport game of teams A and C scheduled at 6 pm on February 4 from the metadata. The controller 170 can obtain a first key parameter for the first sport game of teams A and B at 5 pm on February 3 and a second key parameter for the second sport game of teams A and C at 6 pm on February 4. The first key parameter may include the ID abc123, and the second key parameter may include the ID abc456. In this case, the controller 170 may map ID abc123 to the first sport game and ID abc456 to the second sport game.

In other words, the controller 170 can map the corresponding ID to each sport game according to metadata.

The controller 170 may store data in which IDs corresponding to each of a plurality of sport games are mapped (S109).

The controller 170 may determine whether there is an ID that is not mapped to the sport game according to metadata (S111).

For example, the controller 170 received the first key parameter for the first sport game of Team A and Team B at 7 pm on February 6 from the contents provider, and the first key parameter has ID qwe22. It can be included. However, the controller 170 may not be able to obtain information about the first sport game between teams A and B at 7 PM on February 6 from the metadata. That is, the controller 170 may not be able to obtain the sport game mapped to ID qwe22 from metadata.

Accordingly, the controller 170 can obtain the presence or absence of an ID that is not mapped to the sport game according to metadata.

The controller 170 may determine whether there is an ID that is not mapped to a sport game according to metadata among the IDs received from the contents provider.

If there is no ID that is not mapped to the sport game according to the metadata, the controller 170 may end mapping the ID to the sport game (S121).

That is, the controller 170 can obtain metadata for each of a plurality of sport games, receive IDs for the sport games provided by each contents provider from the contents provider, and map IDs for the sport game provided by the contents provider to the sport game according to the metadata.

If there is an ID that is not mapped to a sport game according to metadata, the controller 170 may request the contents provider (CP) to modify information about the ID that does not have a mapped sport game (S113).

When the contents provider (CP) receives a request to modify information about the ID from the display device 100, it can perform cause analysis and correction of ID miss mapping. (S115).

After performing cause analysis and correction of ID miss mapping, the contents provider (CP) may transmit the corrected ID information to the display device 100 (S117).

After requesting correction of information about the ID, the controller 170 may receive the modified ID information in response.

The controller 170 may remap the sport game corresponding to the modified ID based on information on the modified ID (S119).

The controller 170 may re-map the modified ID to the sport game and then end the ID mapping to the sport game (S121).

The controller 170 may perform the above-described ID mapping operation at each preset period. That is, the controller 170 can update data in which IDs corresponding to each of a plurality of sport games are mapped at each preset period. Since sports data changes frequently, accuracy can be improved by repeating the ID mapping process at regular intervals.

Next, referring to FIGS. 7 to 12, various embodiments in which the display device 100 sets and outputs a sports alarm, such as displaying a viewing icon, will be described.

Figure 7:
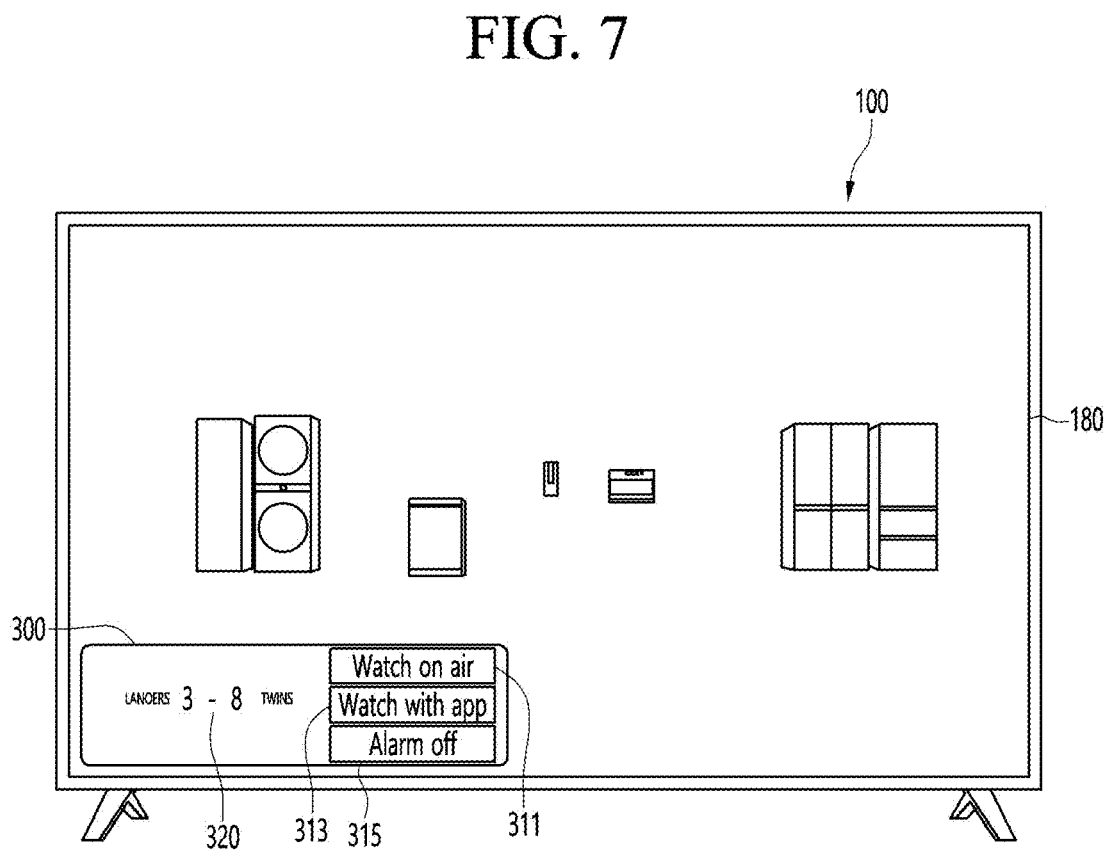

FIG. 7 is a diagram illustrating an example in which a display device according to an embodiment of the present disclosure outputs a sports alarm by displaying a viewing icon.

The controller 170 may output a sports alarm while displaying content such as broadcast video or set-top video. For example, the controller 170 may control the display 180 to display the sports alarm 300 as shown in the example of FIG. 7 when alarm output conditions such as start, score change, or end of the user's preferred sport are satisfied.

The controller 170 may display the sports alarm 300 with priority on a portion of the content currently being output. The sports alarm 300 may be displayed as a pop-up window.

The sports alarm 300 may include at least one of viewing icons 311 and 313 and game state information 320.

The viewing icons 311 and 313 may include at least one of an icon 311 for switching to a channel broadcasting a sport game or an icon 313 for executing an application providing a sport game.

That is, the controller 170 may display at least one of an icon 311 for switching to a channel broadcasting a sport game or an icon 313 for executing an application providing a sport game. When there are a plurality of applications providing a corresponding sport game, the controller 170 may display all of a plurality of icons for executing the plurality of applications providing the corresponding sport game. That is, when the corresponding sport game is provided in the first application and the second application, the controller 170 may display both an icon for executing the first application and an icon for executing the second application.

When the icon 313 for executing an application providing a sport game is selected, the controller 170 may execute the application providing the sport game based on the ID mapped to the sport game.

Game state information 320 indicates the current state of the corresponding sport game and may include whether the game starts/stops/ends, score information, etc.

Additionally, the sports alarm 300 may further include an alarm release icon 315. The controller 170 can end alarm output of the corresponding sport game, when receiving a command selecting the alarm release icon 315.

Figure 8:
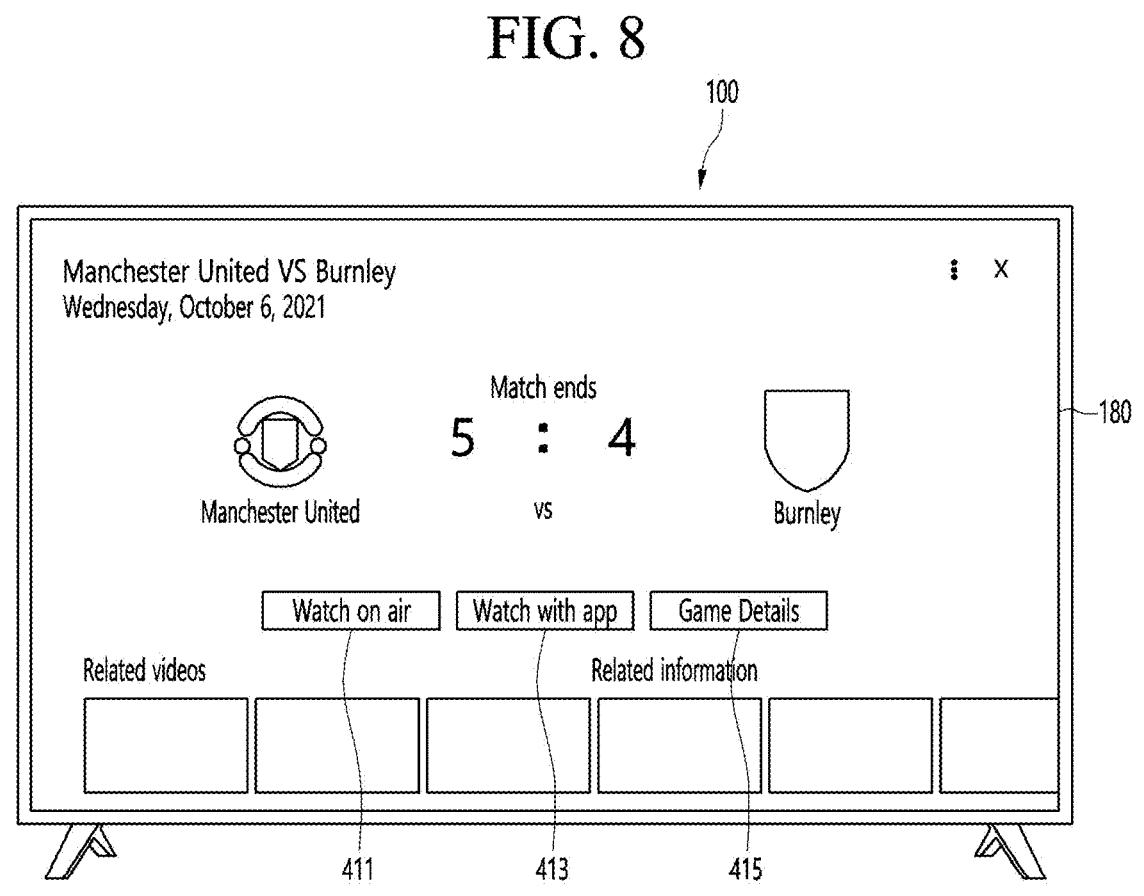

FIG. 8 is a diagram illustrating an example of a screen displayed by a display device according to an embodiment of the present disclosure when a sports alarm is selected.

When the sports alarm 300 shown in the example of FIG. 7 is selected, the controller 170 may display a sport game screen as shown in FIG. 8.

The sport game screen may contain a greater amount of information than that displayed in the sports alarm 300. For example, the sport game screen may further include at least one thumbnail for playing a video related to the sport game. Additionally, the sport game screen may further include link information about team/league-related souvenir sales information corresponding to the sport game. Referring to the example of FIG. 8, the controller 170 may display link information about team/league-related souvenir sales information as a tab for related information in addition to a tab for related videos. The controller 170 may display link information about team/league-related souvenir sales information in the form of a thumbnail, etc. When a thumbnail representing link information on team/league-related souvenir sales information is selected, the controller 170 may run a separate browser containing team/league-related souvenir sales information corresponding to the corresponding sport game.

Additionally, the sport game screen may further include a game details icon 415 along with viewing icons 411 and 413. The viewing icons 411 and 413 may be the same as the viewing icons 311 and 313 of FIG. 7.

When the game details icon 416 is selected, the controller 170 can control the display 180 to display specific information such as events that occurred in the corresponding sport game.

Figure 9:
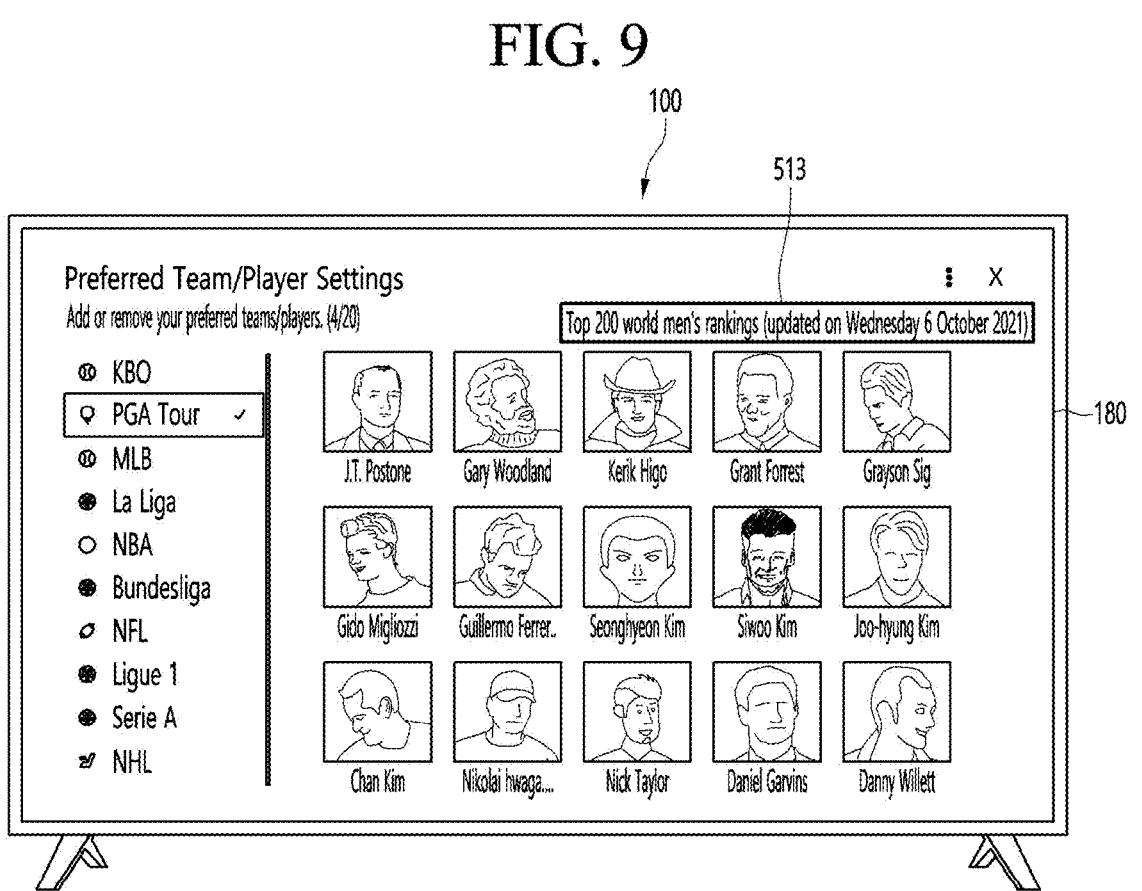
FIG. 9 is a diagram illustrating an example of a screen for a display device according to an embodiment of the present disclosure to allow a user to select a team or player for which a sports alarm is desired.

FIG. 9 is a diagram illustrating an example of a screen for a display device according to an embodiment of the present disclosure to allow a user to select a team or player for which a sports alarm is desired.

The controller 170 may display a screen for selecting a preferred team or player as shown in the example of FIG. 9. The controller 170 provides a menu divided into categories such as sports events and leagues, and when a specific item is selected from the menu, it can display the player or team corresponding to the category of the selected item. When at least one player or team is selected, the controller 170 may output a sports alarm corresponding to the selected player or team.

That is, when receiving an input for selecting at least one of the user's preferred sport event, preferred sport team, or preferred sport player, the controller 170 can determine a display time of the viewing icon corresponding to the preferred sport event, preferred sport team, or preferred sport player, and display the corresponding viewing icon at the determined display time.

Additionally, when displaying a screen for selecting golf players as preferred players, the controller 170 updates the rankings of the players on a daily basis and can control the display 180 to further display this update information 513.

Figure 10:
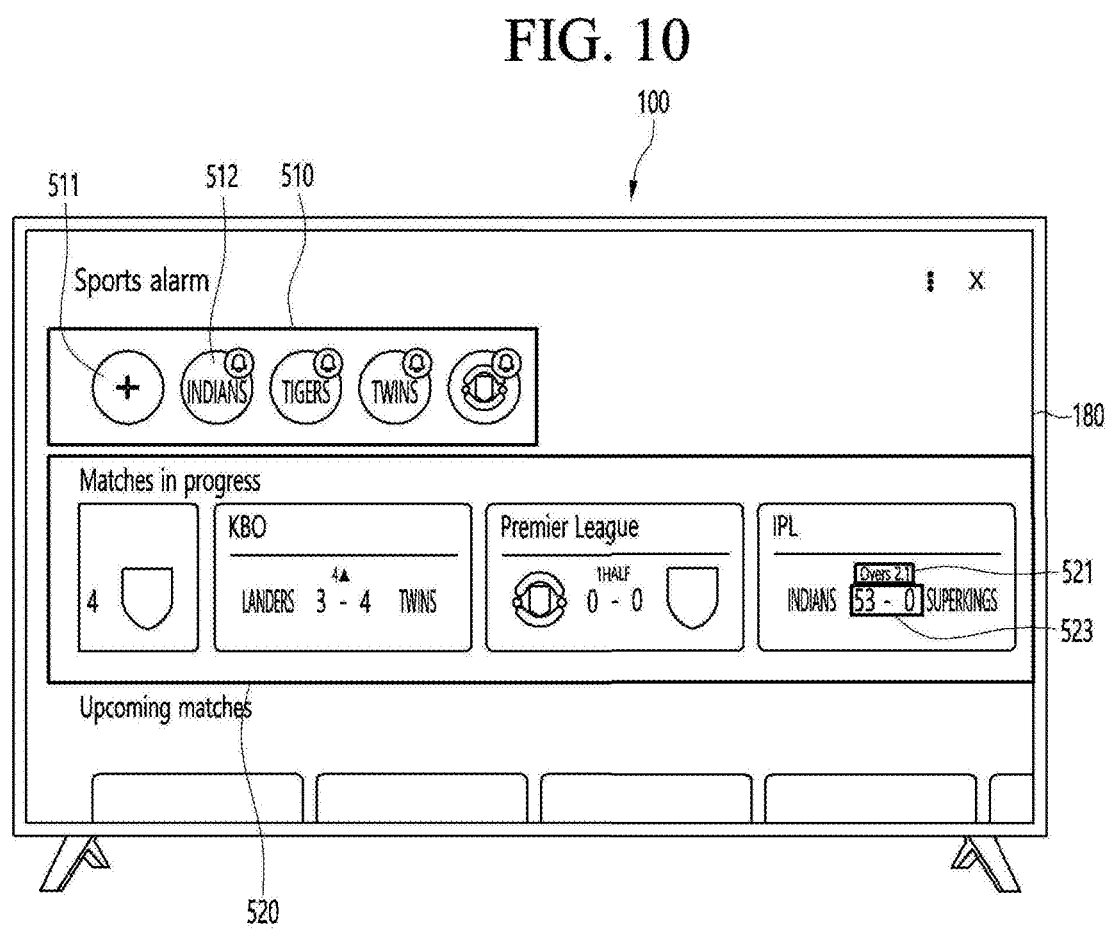

FIG. 10 is a first example diagram of a screen on which a display device displays setting information of a sports alarm according to an embodiment of the present disclosure.

The controller 170 may display a sports alarm setting screen, and the sports alarm setting screen may include set team/player information 510 and in-game information 520, as shown in the example of FIG. 10.

The set team/player information 510 may include at least one of a preferred team/player addition icon 511 or a preset preferred team/player icon 512.

When the preferred team/player addition icon 511 is selected, the controller 170 may display a screen for selecting a preferred team or player, such as the example in FIG. 9.

When the preset preferred team/player icon 512 is selected, the controller 170 may display information on the sport game related to the corresponding team/player.

In-game information 520 may include information about the sport game currently in progress. In-game information 520 may include state information 521 and score information 523 for each sport game currently in progress.

Figure 11:
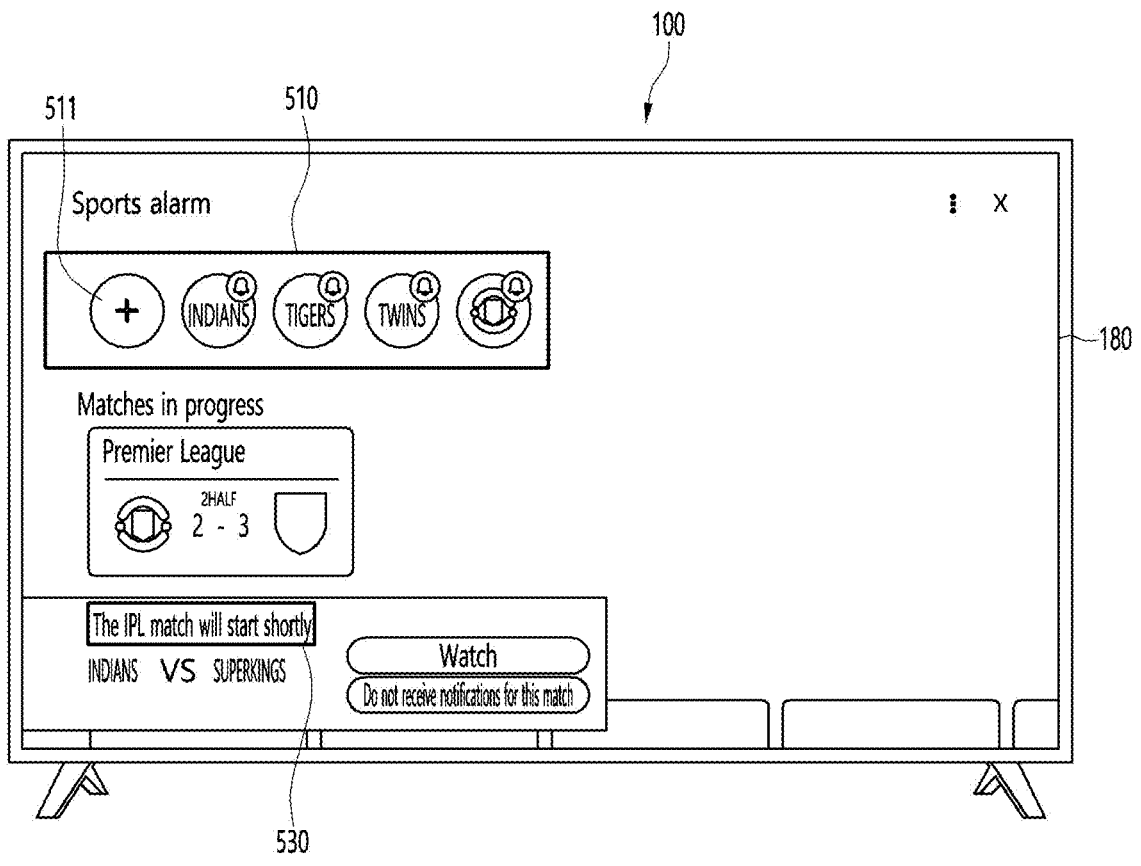
FIG. 11 is a second example diagram of a screen on which a display device displays setting information of a sports alarm according to an embodiment of the present disclosure.

FIG. 11 is a second example diagram of a screen on which a display device displays setting information of a sports alarm according to an embodiment of the present disclosure.

The controller 170 may display the sports alarm 300 even while displaying the sports alarm setting screen as described in FIG. 10. The sports alarm 300 may be displayed as a pop-up window as described in FIG. 7. The controller 170 can overlap and display the sports alarm 300 on the sports alarm setting screen. The sports alarm 300 may include game state information 530, such as a message indicating an upcoming game. The game state information 530 may be the reason for outputting a sports alarm, that is, information on changes in the sport game.

Figure 12:
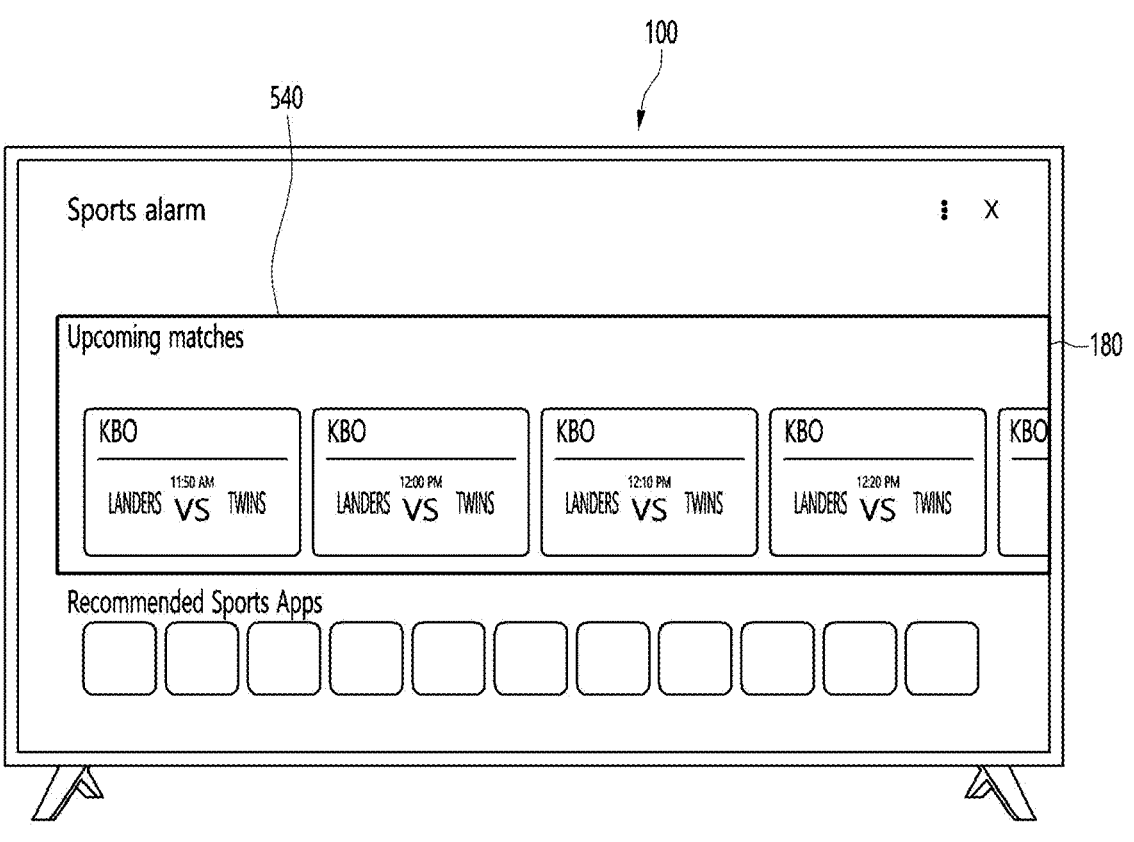
FIG. 12 is a third example diagram of a screen on which a display device displays setting information for a sports alarm according to an embodiment of the present disclosure.

FIG. 12 is a third example diagram of a screen on which a display device displays setting information of a sports alarm according to an embodiment of the present disclosure.

The controller 170 may display a sports alarm settings screen, and the sports alarm settings screen may further include game schedule information 540.

Game schedule information 540 may include information about a sport game scheduled to be played in the future. Game schedule information 540 may include information about each sport game scheduled to be played, and may include, for example, team information, game time information, etc.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

The invention claimed is:

1. A display device, comprising:

a wireless communication interface configured to receive sports information;

a display configured to display a viewing icon for at least one sport game based on the sports information; and a controller configured to display a broadcast of the sport game when the viewing icon is selected, wherein the viewing icon comprises an icon for switching to a channel broadcasting the sport game and an icon for executing an application providing the sport game, wherein the controller is configured to:

acquire metadata for each of a plurality of sport games, receive an ID for the sport game provided by each contents provider from contents provider, map the ID for the sport game provided by the contents provider to the sport game according to the metadata, request the contents provider to modify information about ID that does not have a mapped sport game, if there is no ID mapped to the sport game according to the metadata, receive modified ID information according to the request of modifying information about ID that does not have the mapped sport game, and remap the sport game corresponding to modified ID based on the received modified ID information.

2. The display device according to claim 1, wherein the controller is configured to execute the application providing the sport game based on an ID mapped to the sport game, when the icon for executing the application providing the sport game is selected.

3. The display device according to claim 1, wherein the controller is configured to acquire data in which IDs corresponding to each of a plurality of sports games are mapped.

4. The display device according to claim 3, wherein the controller is configured to update the data at each preset period.

5. The display device according to claim 1, wherein the controller is configured to display a viewing icon for a sport game when the sport game starts or when a score change in the sport game occurs.

6. The display device according to claim 5, when an input for selecting at least one of the user's preferred sport event, preferred sport team, or preferred sport player is received, wherein the controller is configured to display a viewing icon corresponding to the preferred sport event, preferred sport team, or preferred sport player.

7. The display device according to claim 1, wherein the controller is configured to further display at least one of the game information, game detailed information icon, and alarm release icon along with the viewing icon.

8. An operating method of display device, comprising:
receiving sports information;
displaying a viewing icon for at least one sport game based on the sports information; and
displaying a broadcast of the sport game, when the viewing icon is selected,
wherein the displaying of the viewing icon comprises displaying an icon for switching to a channel broadcasting the sport game and an icon for executing an application providing the sport game,
wherein the operating method further comprising:
acquiring metadata for each of a plurality of sport games, receiving an ID for the sport game provided by each contents provider from contents provider,
mapping the ID for the sport game provided by the contents provider to the sport game according to the metadata,
requesting the contents provider to modify information about ID that does not have a mapped sport game, if there is no ID mapped to the sport game according to the metadata,
receiving modified ID information according to the request of modifying information about ID that does not have the mapped sport game, and
remapping the sport game corresponding to modified ID based on the received modified ID information.

9. The operating method according to claim 8, wherein displaying the broadcast of the sport game comprises executing the application providing the sport game based on an ID mapped to the sport game, when the icon for executing the application providing the sport game is selected.

10. The operating method according to claim 8, further comprising acquiring data in which IDs corresponding to each of a plurality of sports games are mapped.

11. The operating method according to claim 8, wherein displaying of the viewing icon comprises displaying a viewing icon for a sport game when the sport game starts or when a score change in the sport game occurs.

* * * * *